(12) United States Patent
Xie et al.

(10) Patent No.: US 9,405,410 B2
(45) Date of Patent: Aug. 2, 2016

(54) TOUCH SENSING ELECTRODE AND TOUCH PANEL USING THE SAME

(75) Inventors: Yanjun Xie, Wuhan (CN); Yau-Chen Jiang, Zhubei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 13/592,365

(22) Filed: Aug. 23, 2012

(65) Prior Publication Data

US 2013/0057488 A1  Mar. 7, 2013

(30) Foreign Application Priority Data

Sep. 7, 2011 (CN) .......................... 2011 1 0280958

(51) Int. Cl.
*G06F 3/044* (2006.01)
(52) U.S. Cl.
CPC ...... *G06F 3/044* (2013.01); *G06F 2203/04112* (2013.01)
(58) Field of Classification Search
CPC ..................................................... H03K 17/94
USPC .................................................. 345/156–173
See application file for complete search history.

(56) References Cited

U.S. PATENT DOCUMENTS

| 7,129,935 | B2 | 10/2006 | Mackey | |
|---|---|---|---|---|
| 2007/0262962 | A1* | 11/2007 | XiaoPing et al. | 345/173 |
| 2008/0277259 | A1* | 11/2008 | Chang | 200/600 |
| 2008/0278178 | A1* | 11/2008 | Philipp | 324/662 |
| 2012/0044095 | A1* | 2/2012 | Makovetskyy | G06F 3/044 341/33 |

FOREIGN PATENT DOCUMENTS

| CN | 101719044 A | 6/2010 |
|---|---|---|
| JP | 2009009574 | 1/2009 |
| JP | 2010146283 | 7/2010 |
| JP | 2010198615 | 9/2010 |
| JP | 2010231533 | 10/2010 |
| JP | 2011129112 | 6/2011 |
| JP | 2011517355 | 6/2011 |
| KR | 2009098947 A | 9/2009 |
| KR | 20110062469 | 6/2011 |
| TW | 200901014 | 1/2009 |

* cited by examiner

*Primary Examiner* — Grant Sitta
(74) *Attorney, Agent, or Firm* — Gokalp Bayramoglu; Paul Bendemire

(57) ABSTRACT

The present invention provides a touch sensing including a plurality of first sensing lines. Each first sensing line includes a first main trace and a plurality of first trace patterns wherein at least a first cross posit is disposed between the first main trace and the trace patterns. The present invention further provides a touch panel of using the same.

18 Claims, 5 Drawing Sheets

TOUCH SENSING ELECTRODE AND TOUCH PANEL USING THE SAME

This application claims the benefit of Chinese application No. 201110280958.7, filed on Sep. 7, 2011.

BACKGROUND OF THE INVENTION

1. Field of the Invention

The present invention relates to a touch panel, and more particularly, to a touch panel having a novel touch sensing electrode.

2. Description of the Prior Art

Currently, in the market of various kinds of consumer electronic products, touch panels have been widely used in portable electronic devices such as personal digital assistants (PDA), mobile phones, notebook computers, personal computers and digital home appliances for providing human machine interface. When using a touch panel, a user can directly input, commands by touching objects displayed on a panel, thus providing a more user-friendly interface. As electronic devices become smaller, buttons, mouse and keyboard type input devices are gradually replaced by touch panels for inputting data into those electronics devices. Accordingly, a touch display device with a touch panel has become the key component of various electronic products.

A touch display panel has a touch sensing array for detecting touches on it. The touch sensing array has a plurality of horizontal sensing electrodes and a plurality of vertical sensing electrodes, for respectively sensing the horizontal or vertical axis of input positions. In general, the sensing electrodes usually include transparent conductive material so as to allow the transmittance of the images from the below display panel through the touch panel. However, the resistance of the transparent conductive material such as indium tin oxide (ITO) is usually high and as a result the sensitivity of the touch panel is lowered. Accordingly, a touch sensing electrode having better sensitivity is required.

SUMMARY OF THE INVENTION

It is one of the objects of the present invention to provide a touch sensing electrode which cant sins a trace patters electrode to serve as the sensing electrode of the touch panel. The touch sensing electrode in the present invention has low electrical resistance and therefore can enhance the sensitivity of the touch panel According to one embodiment of the present invention, a touch sensing electrode is provided. The touch sensing electrode includes a plurality of first sensing lines. Each first sensing line includes a first main trace and a plurality of first trace patterns wherein at least a first cross point is disposed between the first main trace and the trace patterns. The present invention further provides a touch panel of using the same.

The present invention provides a novel touch sensing electrode, wherein the first sensing line and/or the second sensing line include a main trace and at least a trace pattern which are made of metal. Due to the high electrical conductivity of metal, the sensitivity of the tones panel can be improved.

These and other objectives of the present invention will no doubt become obvious to those of ordinary skill in the art after reading the following detailed description of the preferred embodiment that is illustrated in the various figures and drawings.

DETAILED DESCRIPTION

For those skilled in the art to understand this invention, numerous embodiments are described below annexing drawings to illustrate the matters of the invention and the purpose thereof.

Figure 1:
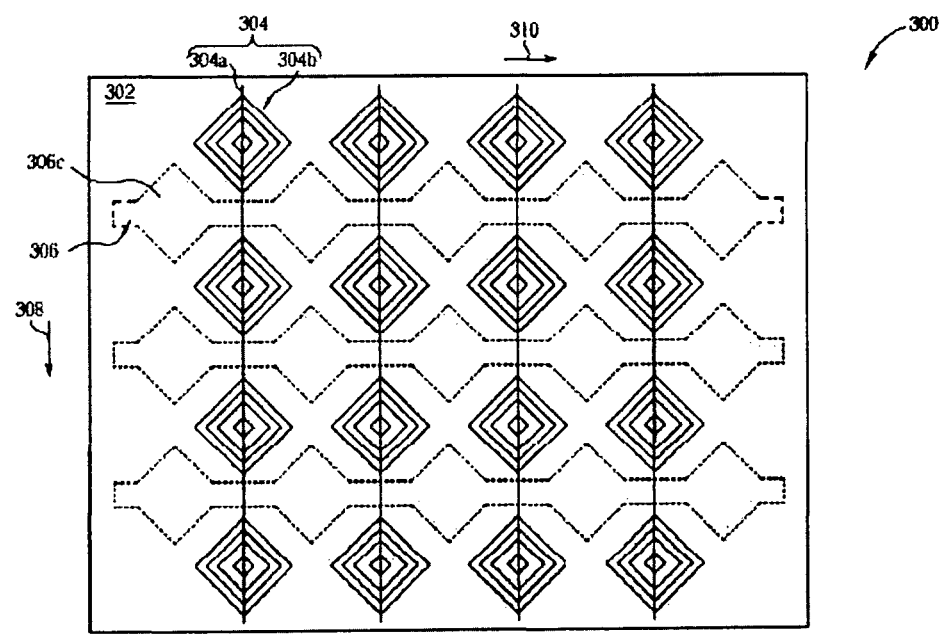
FIG. 1 illustrates a schematic diagram of the touch sensing electrode of the touch panel in accordance with the first embodiment of the present invention.

Please refer to FIG. 1, illustrating a schematic diagram of the touch sensing electrode of the touch panel in accordance with the first embodiment of the present invention. As shown in FIG. 1, the touch panel 300 in the present embodiment includes a substrate 302 and a plurality of first sensing lines 304 and a plurality of second sensing lines 306 disposed on the substrate 302. The substrate 302 may be any flexible transparent substrate or any rigid transparent substrate such as a glass substrate, a plastic substrate or a quartz substrate. In the present embodiment, the first sensing lines 304 and the second sensing lines 306 are disposed on two different sides of the substrate 302. The first sensing fanes 304 are parallel to each other and are stretching along a first direction 308, and the second sensing lines 306 are parallel to each other and are stretching along a second direction 310. The first direction 308 is substantially perpendicular to the second direction 310.

Figure 2:
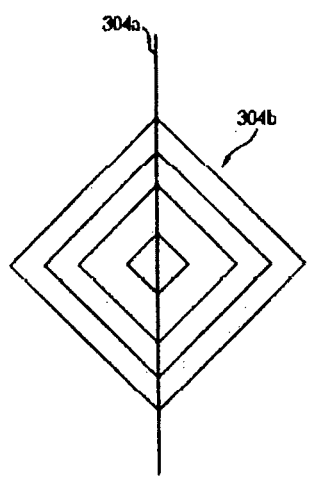
FIG. 2 illustrates a schematic diagram of the first trace pattern according to one embodiment of the present invention.
Figure 6:
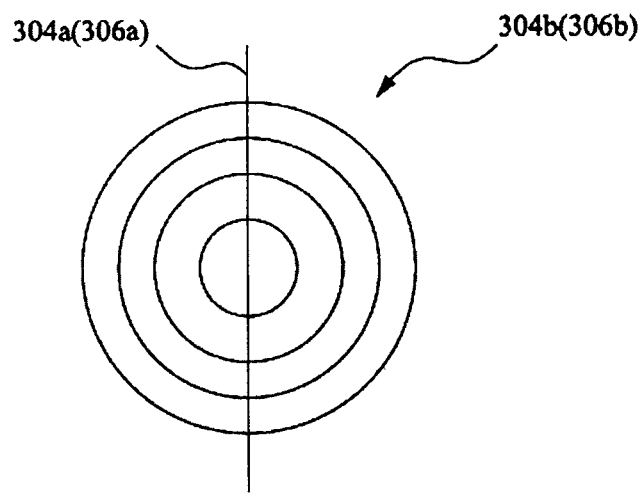
FIGS. 6-8 are top views schematically illustrating the first trace pattern and the second trace pattern according to some embodiment of the present invention.
Figure 7:
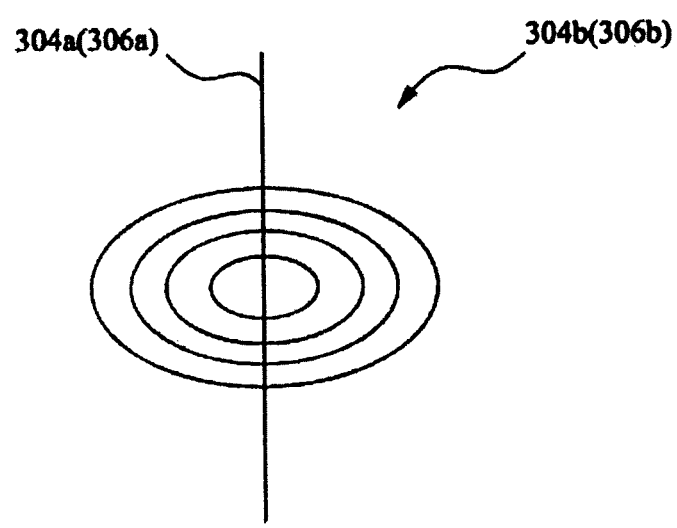
Figure 8:
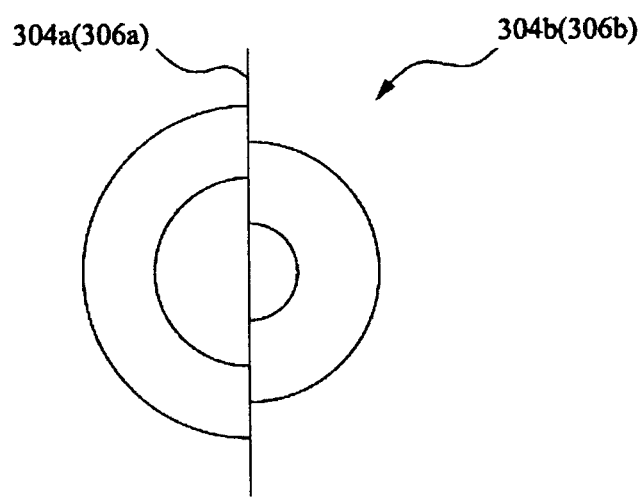

As shown in FIG. 1, each first sensing line 304 includes a first main trace 304a and a plurality of first trace patterns 304b. The first main trace 304a is substantially parallel to the first direction 308. The first trace pattern 304b is formed by a continuous trace line showing a closed or an enclosed pattern, thereby forming a fingerprint-like pattern. At least a first cross point is disposed between the first main trace 304a and the first trace patterns 304b. A line width of the first trace pattern 304b is usually between 3 micrometers (μm) and 15 μm. Please refer to FIG. 2, illustrating a schematic diagram of the first trace pattern according to one embodiment of the present invention. As shown in FIG. 2, the first trace pattern 304 is preferably a symmetrical shape wherein the axis of symmetry is the first main trace 304a. The plurality of first trace patterns 304b can consist of a plurality of concentric trace patterns which may include a polygon, a circle, an ellipse, a circle sector or a circular segment, but is not limited thereto, as shown in FIGS. 6-8. In one preferred embodiment, the first trace pattern 304b includes a plurality of concentric rhombuses which are gradually shrinking in a relative portion. A plurality of gaps are formed between each concentric rhombus to allow the displayed images from the below display panel (not shown) pass therethrough. In one preferred embodiment, the gap is substantially greater than 0.5 mm.

In the present embodiment, the first main traces 304a and the first trace patterns 304b of the first sensing lines 304 are formed by the same step and the material thereof may include any low-reflective and high-conductive compound such as metal, conductive photoresist, conductive ink or carbon film.

If the first sensing lines 304 include metal, such as gold, silver, copper, aluminum, molybdenum, titanium, tantalum, cadmium, or nitride thereof, or oxide thereof, or alloy thereof, or the combination thereof, the first sensing lines 304 may be fabricated by a conventional semiconductor method. If the first sensing lines 304 include conductive photoresist, they can be formed by a photolithography process. If the first sensing lines 304 include conductive ink or carbon film, they can be formed by an ink jet printing method, for example. Since the conductive material used for the first sensing lines 304 has higher electrical conductivity, the sensitivity of the touch panel 300 can be improved. Moreover, because the first trace patterns 304b consist of a plurality of trace patterns with small line width, the displayed images from the below display panel will not be affected even if a non-transparent or translucent material is used for the first trace patterns 304b.

As shown in FIG. 1, the second sensing lines 306 are disposed on the other side of the substrate 302 relative to the first sensing lines 304. In the present embodiment each second sensing line 306 includes a plurality of sensing pads 3(c)6c electrically connected to each other. In one embodiment the area of the sensing pad 306c is substantially equal to that of the first trace pattern 304b. The sensing pads 306 may have a single-layered structure or a multi-layered structure including transparent conductive material such as indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO), but is not limited thereto.

In the present embodiment, the first sensing lines 304 and the second sensing lines 306 are connected to an integrated chip (not shown) by a plurality of conductive lines (not shown) on the peripheral, region of the substrate 302 such that the first, sensing lines 304 and the second sensing lines 306 can be driven thereby and the sensing function can be carried out. The detailed descriptions of the driving method are well known in the arts and are not described for the sake of simplicity. The touch panel 300 in the present embodiment can sense the touch position along the first direction 308 and the second direction 310 through the first sensing lines 304 and the second sensing lines 306. The touch panel 300 in the present invention can also provide multi-touch function. In another salient feature of the present embodiment, since the first sensing lines 304 include metal and the second sensing lines 306 include transparent conductive material, for example, the first sensing lines 304 and the second sensing lines 306 are disposed on two respective sides of the substrate 302 and the fabrication methods thereof would sot be affected by each other and can be easier to operate. Consequently, the yields of the product can be increased.

Figure 3:
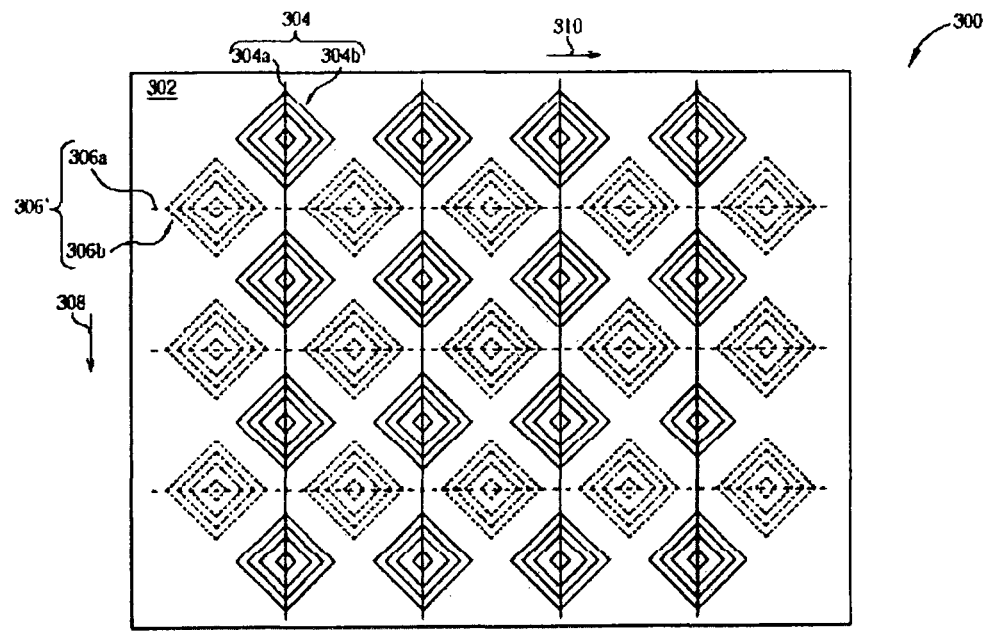
FIG. 3 illustrates a schematic diagram of the touch sensing electrode of the touch panel in accordance with the second embodiment of the present invention.

Please refer to FIG 3, illustrating a schematic diagram of the touch sensing electrode of the touch panel in accordance with the second embodiment of the present invention. The main difference between the second embodiment and the first embodiment lies in that the second sensing lines 306' can also include trace patterns. As shown is FIG. 3, each second sensing line 306" includes a second main trace 306a and a plurality of second trace patterns 306b. The second main trace 306a is substantially parallel to the second direction 310. The second trace pattern 306b is foamed by a continuous trace line showing a closed or an unclosed pattern. At least a second cross point is disposed between the second main trace 306a and each second trace pattern 306b. A tine width of the second trace pattern 306b is usually between 3 μm and 15 μm. The embodiment of the second trace pattern 306b is similar to that of the first trace pattern 304b is the first embodiment and will not be described repeatedly.

Figure 4:
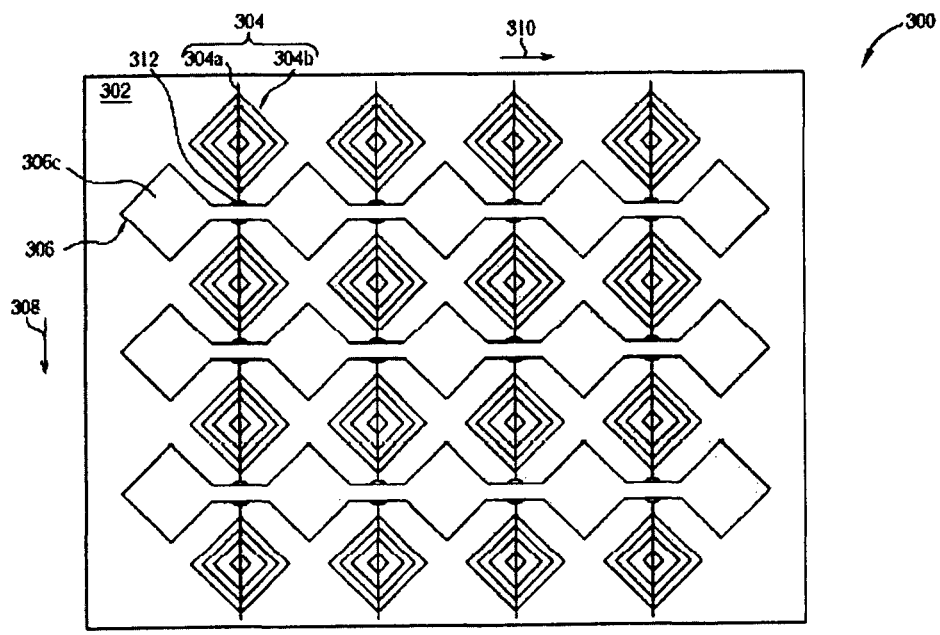
FIG. 4 illustrates a schematic diagram of the touch sensing electrode of the touch panel in accordance with the third embodiment of the present invention.

Please refer to FIG. 4, illustrating a schematic diagram of the touch sensing electrode of the touch panel is accordance with the third embodiment of the present invention. As shown in FIG. 4, the first sensing lines 304 and the second sensing lines 306 are disposed on the same side of the substrate 302. The first sensing lines 304 are parallel to each other and are stretching along a first direction 308. The second sensing lines 306 are parallel to each other and are stretching along a second direction. 310. The first direction 308 is substantially perpendicular to the second direction 310. Each first sensing line 304 includes a first main trace 304a and a plurality of first trace patterns 304b. The first main trace 304a is substantially parallel to the first direction 308. The first trace pattern 304b consists of a continuous trace line showing a closed or an unclosed pattern, thereby forming a fingerprint-like pattern. A line width of the first trace pattern 304b is usually between 3 μm and 15 μm. The embodiment of the first trace pattern 304b is similar to that in the first embodiment and will not be repeated. Each second sensing line 306 includes a plurality of sensing pads 306c electrically connected to each other. The sensing pads 306 may have a single-layered structure or a multi-layered structure. The embodiment of the second trace pattern 306 is similar to that in the first embodiment and will not be repeated. In addition, the touch panel 300 in the present embodiment further includes a plurality of insulation mounds 312 disposed on the substrate 302. Specifically, the insulation mounds 312 are disposed between the first sensing lines 304 and the second sensing lines 306 to insulate therebetween. In one embodiment, the first sensing lines 304 straddle on the insulation mounds 312 while the second sensing lines 306 are under the insulation mounds 312. In another embodiment, the second sensing lines 306 straddle on the insulation mounds 312 while the first sensing lines 304 are under the insulation mounds 312. The insulation mound 312 may be made of various insulation materials such as silicon oxide ($SiO_2$), silicon nitride (SiN), silicon oxynitride (SiCN), silicon carbide (SiC), or the combination thereof, but is not limited thereto.

Figure 5:
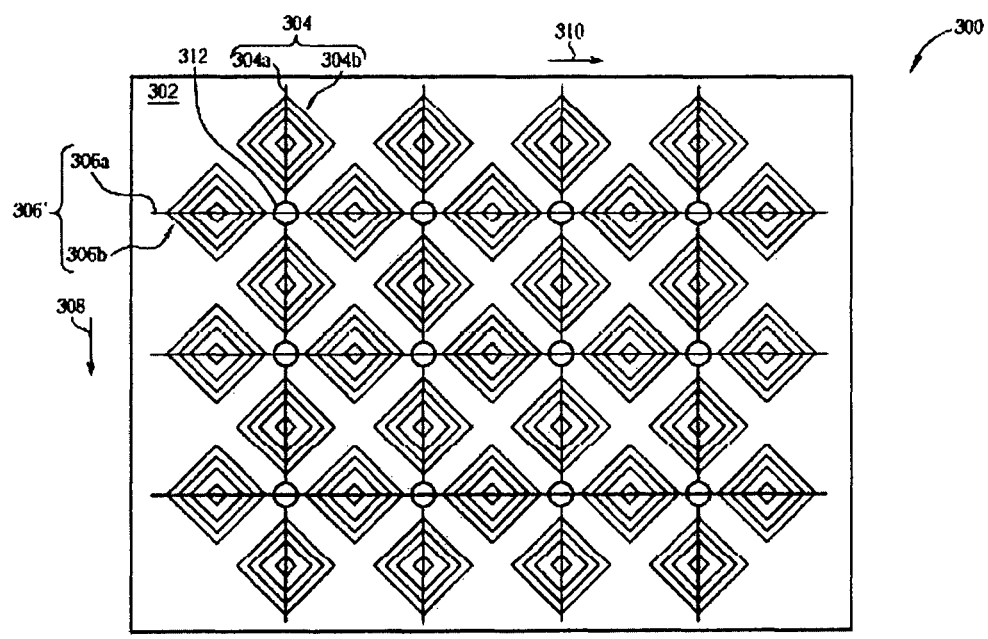
FIG. 5 illustrates a schematic diagram of the touch sensing electrode of the touch panel in accordance with the fourth embodiment is the present invention.

Please refer to FIG. 5, illustrating a schematic diagram of the touch sensing electrode of the touch panel in accordance with the fourth embodiment in the present invention. The main difference between the fourth embodiment and the third embodiment lies in that the second sensing lines 306' can also include trace patterns. As shown is FIG. 5, each second sensing line 306' includes a second main trace 306a and a plurality of second trace patterns 306b. The second main trace 386a is substantially parallel to the second direction 310. The second trace pattern 306b consists of a continuous trace line showing a closed or an unclosed pattern, thereby forming a fingerprint-like pattern. A line width of the second trace pattern 306b is usually between 3 μm and 15 μm. The embodiment of the second trace pattern 306b is similar to that of the first trace pattern 304b in the first, embodiment and will not be repeated. It is noted that, in order to prevent the disturbance when forming the first sensing lines 304 and the second sensing lines 306', the first sensing lines 304 preferably includes material having good etching selectivity with respect to that of the second sensing lines 306". For example, when the first sensing lines 304 include metal, the second sensing lines 306 may include carbon film. In addition, the touch panel 300 in the present embodiment further includes a plurality of insulation mounds 312 disposed on the substrate 302. Specifically, the insulation mounds 312 are disposed between the first sensing fines 304 and the second sensing lines 306' to insulate therebetween. In one embodiment, the first sensing lines 304 straddle on the insulation mounds 312 while the second sensing lines 306' are under the insulation mounds 312. In another embodiment, the second sensing lines 306" straddle on the insulation mounds 312 while the first sensing lines 304 are under the insulation mounds 312. The insulation mound 312 may be made of various insulation materials such as silicon oxide ($SiO_2$), silicon nitride (SiN), silicon oxynitride (SiCN), silicon carbide (SiC), or the combination thereof, but is not limited thereto.

In summary, the present invention provides a touch sensing electrode wherein the first sensing lines and/or the second sensing lines include a main trace and at least a trace pattern which are made of conductive material such as metal. Since the metal has lower electrically resistance, the sensitivity of the touch panel can be improved. And the width of the trace pattern is narrow, the displayed images from the below display panel will not be affected.

Those skilled in the art will readily observe that numerous modifications and alterations of the device and method may be made while retaining the teachings of the invention.

What is claimed is:

1. A touch panel, comprising:
a transparent substrate; and
a touch sensing electrode formed on the transparent substrate and comprising a plurality of first sensing lines, wherein each first sensing line includes:
at least one first trace pattern comprising an outer loop and an inner loop encircled by the outer loop, wherein the inner loop is spaced apart from the outer loop by a spacing such that the outer loop is free from overlapping the inner loop; and
a first main trace passing through the inner loop and the outer loop, wherein the first main trace has a first segment and a second segment respectively extending from opposite sides of the inner loop to the outer loop, wherein the spacing continuously extends from the first segment to the second segment; and
wherein the inner loop and the outer loop are formed by a continuous trace line showing a closed or an enclosed pattern.

2. The touch panel according to claim 1, wherein the first sensing lines are parallel to each other and are stretching along a first direction.

3. The touch panel according to claim 2, wherein the touch sensing electrode further comprises a plurality of second sensing lines parallel to each other and stretching along a second direction, wherein the first sensing lines and the second sensing lines are insulated from each other.

4. The touch panel according to claim 1, wherein each first trace pattern comprises a plurality of concentric trace patterns.

5. The touch panel according to claim 1, wherein the shape of the first trace pattern comprises a polygon, a circle, an ellipse or a circular segment.

6. The touch panel according to claim 1, wherein the first trace pattern is a symmetrical shape and the axis of symmetry is the first main trace.

7. The touch panel according to claim 1, wherein the first sensing lines comprise metal, conductive photoresist, conductive ink or carbon film.

8. The touch panel according to claim 3, wherein the second sensing lines comprise transparent conductive material.

9. The touch panel according to claim 3, wherein each second sensing line comprises a second main trace and a plurality of second trace patterns wherein at least a second cross point is disposed between the second main trace and each second trace pattern.

10. The touch panel according to claim 9, wherein the second sensing lines comprise metal, conductive photoresist, conductive ink or carbon film.

11. The touch panel according to claim 9, wherein each second trace pattern comprises a plurality of concentric trace patterns.

12. The touch panel according to claim 9, wherein the shape of the second trace pattern comprises a polygon, a circle, an ellipse or a circular segment.

13. The touch panel according to claim 9, wherein each second trace pattern is a symmetrical shape and the axis of symmetry is the main second trace.

14. The touch panel according to claim 3, wherein the first sensing lines and the second sensing lines are disposed on the same side of a substrate.

15. The touch panel according to claim 3, wherein the first sensing lines and the second sensing lines are disposed on two different sides of a substrate.

16. The touch panel according to claim 15, further comprising a plurality of insulation mounds disposed between the first sensing lines and the second sensing lines to insulate therebetween.

17. A touch panel, comprising:
a transparent substrate; and
a touch sensing electrode formed on the transparent substrate and comprising:
a plurality of first sensing lines stretching along a first direction on the transparent substrate, wherein each first sensing line includes:
at least one first trace pattern including an outer loop and an inner loop encircled by the outer loop, wherein the inner loop is spaced apart from the outer loop by a spacing such that the outer loop is free from overlapping the inner loop, wherein the inner loop and the outer loop are of concentric trace patterns; and
a first main trace passing through the inner loop and the outer loop, wherein the first main trace has a first segment and a second segment respectively extending from opposite sides of the inner loop to the outer loop, wherein the spacing continuously extends from the first segment to the second segment; and
a plurality of second sensing lines stretching along a second direction on the transparent substrate, wherein the first sensing lines and the second sensing lines are insulated from each other; and
wherein the inner loop and the outer loop are formed by a continuous trace line showing a closed or an enclosed pattern.

18. A touch panel, comprising:
a transparent substrate; and
a touch sensing electrode formed on the transparent substrate and comprising:
a plurality of first sensing lines stretching along a first direction on the transparent substrate, wherein each first sensing line is made from an opaque material, and includes:
at least one first trace pattern including an outer loop and an inner loop encircled by the outer loop, wherein the inner loop is spaced apart from the outer loop by a spacing such that the outer loop is free from overlapping the inner loop; and a first main trace passing through the inner loop and the outer loop, wherein the first main trace has a first segment and a second segment respectively extending from opposite sides of the inner loop to the outer loop, wherein the spacing continuously extends from the first segment to the second segment; and a plurality of second sensing lines stretching along a second direction on the transparent substrate, wherein the first sensing lines and the second sensing lines are insulated from each other, and wherein the second sensing lines comprise transparent conductive material; and wherein the inner loop and the outer loop are formed by a continuous trace line showing a closed or an enclosed pattern.

* * * * *